US011544615B2

(12) United States Patent
Griffin et al.

(10) Patent No.: US 11,544,615 B2
(45) Date of Patent: Jan. 3, 2023

(54) MANAGING RUNTIME QUBIT ALLOCATION FOR EXECUTING QUANTUM SERVICES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/332,376

(22) Filed: May 27, 2021

(65) Prior Publication Data

US 2022/0383171 A1 Dec. 1, 2022

(51) Int. Cl.
*G06F 1/00* (2006.01)
*G06N 10/00* (2022.01)
*G06F 1/3296* (2019.01)

(52) U.S. Cl.
CPC .......... *G06N 10/00* (2019.01); *G06F 1/3296* (2013.01)

(58) Field of Classification Search
CPC .............................. G06F 1/3296; G06N 10/00
See application file for complete search history.

(56) References Cited

U.S. PATENT DOCUMENTS

| | | | |
|---|---|---|---|
| 5,497,497 A * | 3/1996 | Miller | G06F 15/177 713/1 |
| 9,858,531 B1 | 1/2018 | Monroe et al. | |
| 10,592,816 B1 | 3/2020 | Hsu et al. | |
| 10,621,140 B2 | 4/2020 | Raymond | |
| 10,831,455 B2 | 11/2020 | Gambetta et al. | |
| 2002/0059550 A1* | 5/2002 | Kondo | H04N 19/593 714/787 |
| 2007/0136725 A1* | 6/2007 | Accapadi | G06F 9/526 718/100 |

(Continued)

FOREIGN PATENT DOCUMENTS

JP 2019513249 A 5/2019

OTHER PUBLICATIONS

Author Unknown, "Quantum Memory Management," Microsoft, Jan. 2, 2021, https://docs.microsoft.com/en-us/azure/quantum/user-guide/language/statements/quantummemorymanagement, 4 pages.

(Continued)

*Primary Examiner* — Mohammed H Rehman
(74) *Attorney, Agent, or Firm* — Dority & Manning, P.A.

(57) ABSTRACT

Managing runtime qubit allocation for executing quantum services is disclosed. In one example, a processor device of a quantum computing system implements a quantum backoff service (QBS) that enables safe runtime qubit allocation for executing quantum services. The QBS receives a request from a quantum service scheduler for allocation of one or more qubits for an executing quantum service. Upon receiving the request for allocation, the QBS determines whether the one or more qubits are unavailable for execution. If the QBS determines that the one or more qubits are unavailable for allocation, the QBS places the executing quantum service into a sleep state. The QBS in some examples may subsequently receive an indication that the one or more qubits have become available for allocation. The QBS then restores the executing quantum service into an executing state and allocates the one or more qubits for the executing quantum service.

19 Claims, 6 Drawing Sheets

(56) References Cited

U.S. PATENT DOCUMENTS

| | | | |
|---|---|---|---|
| 2011/0047549 A1* | 2/2011 | Rogers | G06F 9/526 718/100 |
| 2019/0042392 A1* | 2/2019 | Matsuura | G06N 10/00 |
| 2019/0102496 A1* | 4/2019 | Bishop | G06F 9/453 |
| 2019/0164059 A1 | 5/2019 | Denchev et al. | |
| 2020/0074346 A1 | 3/2020 | Griffin et al. | |
| 2020/0125402 A1* | 4/2020 | Griffin | G06F 9/5027 |
| 2021/0152346 A1* | 5/2021 | Bucklew | H04B 10/66 |

OTHER PUBLICATIONS

Dury, B. et al., "A QUBO formulation for qubit allocation," arXiv:2009.00140v2 [quant-ph], Nov. 28, 2020, 17 pages.

Liu, L. et al., "A New Qubits Mapping Mechanism for Multi-programming Quantum Computing," Preprint, Apr. 2020, https://www.researchgate.net/publication/340963391_A_New_Qubits_Mapping_Mechanism_for_Multi-programming_Quantum_Computing, 13 pages.

Mina, M. et al., "EntangleNet: Theoretical Reestablishment of Entanglement in Quantum Networks," Applied Sciences, vol. 8, No. 10, Oct. 2018, 17 pages.

Siraichi, M. et al., "Qubit Allocation as a Combination of Subgraph Isomorphism and Token Swapping," Proceedings of the ACM on Programming Languages, vol. 3, No. OOPSLA, Article No. 120, Oct. 2019, ACM, pp. 120:1-29.

\* cited by examiner

MANAGING RUNTIME QUBIT ALLOCATION FOR EXECUTING QUANTUM SERVICES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently manage allocation of limited numbers of qubits among multiple executing quantum services will be desirable.

SUMMARY

The examples disclosed herein implement a quantum backoff service (QBS) that enables management of runtime qubit allocation among executing quantum services. Upon receiving a request for runtime allocation of qubits for an executing quantum service, the QBS determines whether the requested qubits are available, and, if not, will "back off" the request by placing the executing quantum service in a sleep state. In this manner, continued safe execution of quantum services may be ensured in circumstances in which an insufficient number of qubits are available for allocation to the executing quantum services.

In one example, a method for managing runtime qubit allocation for executing quantum services is disclosed. The method comprises receiving, by a quantum computing device, a first request from a quantum service scheduler for allocation of a first one or more qubits for a first executing quantum service. The method further comprises determining that the first one or more qubits are unavailable for allocation. The method also comprises, responsive to determining that the first one or more qubits are unavailable for allocation, placing the first executing quantum service into a sleep state.

In another example, a quantum computing device for managing runtime qubit allocation for executing quantum services is disclosed. The quantum computing device comprises a system memory, and a processor device communicatively coupled to the system memory. The processor device is to receive a first request from a quantum service scheduler for allocation of a first one or more qubits for a first executing quantum service. The processor device is further to determine that the first one or more qubits are unavailable for allocation. The processor device is also to, responsive to determining that the first one or more qubits are unavailable for allocation, place the first executing quantum service into a sleep state.

In another example, a non-transitory computer-readable medium is disclosed. The non-transitory computer-readable medium stores thereon computer-executable instructions that, when executed, cause one or more processor devices to receive a first request from a quantum service scheduler for allocation of a first one or more qubits for a first executing quantum service. The computer-executable instructions further cause the one or more processor devices to determine that the first one or more qubits are unavailable for allocation. The computer-executable instructions also cause the one or more processor devices to, responsive to determining that the first one or more qubits are unavailable for allocation, place the first executing quantum service into a sleep state.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
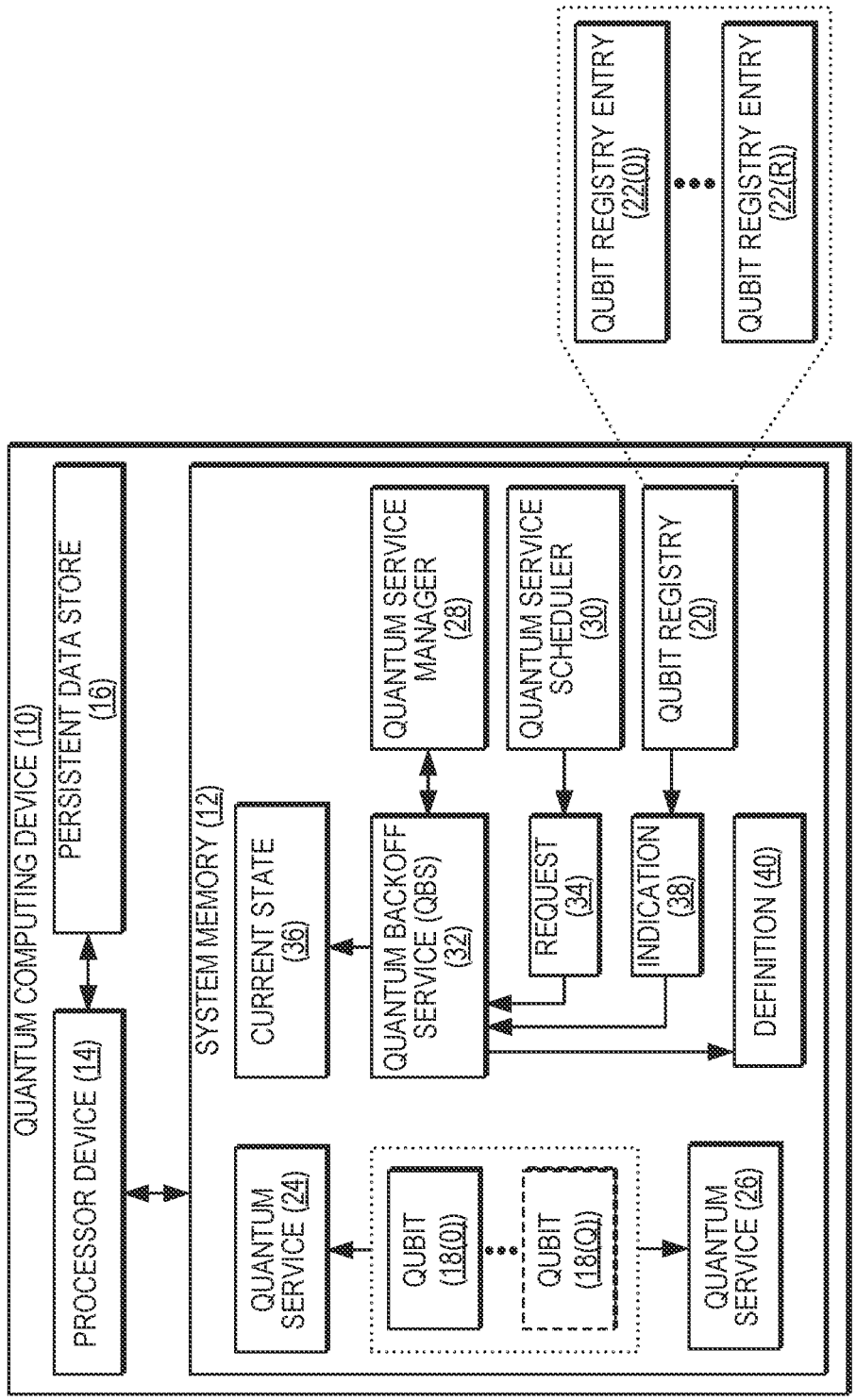
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because qubits generally require very specific environmental conditions for operation, the number of qubits available to quantum services that are executing on a given quantum computing device may be limited. Moreover, if qubits are assigned specific properties during execution (e.g., placed in a state of entanglement or superposition, as non-limiting examples) by a first quantum service, an attempt by a second quantum service to allocate or access those qubits may result in a disruption of those specific properties, which may cause operations of the first quantum service to fail. Thus, an ability to efficiently manage runtime qubit allocation for executing quantum services will be desirable.

The examples disclosed herein implement a quantum backoff service (QBS) that enables safe runtime qubit allocation for executing quantum services. As used herein, the term "quantum service" and derivatives thereof refer to a process that executes on a quantum computing device, and that accesses one or more qubits to provide a desired functionality. In exemplary operation, the QBS executed by a processor device of a quantum computing device receives a request from a quantum service scheduler for allocation of one or more qubits for an executing quantum service (i.e., a quantum service currently being run by the processor device). In some examples, the request may comprise a request for a specified number of qubits, while some examples may provide that the request comprises a request for one or more identified qubits.

Upon receiving the request for allocation of the one or more qubits, the QBS determines whether the one or more qubits are unavailable for execution. For instance, if the request indicates a specified number of qubits, the QBS may determine whether fewer than the specified number of qubits are available for allocation. Likewise, if the request is for one or more identified qubits, the QBS may determine whether at least one of the one or more identified qubits are unavailable for allocation. In some examples, the QBS may ascertain the availability of the one or more qubits by consulting a qubit registry provided by the quantum computing device.

If the one or more qubits are available, the QBS allocates the one or more qubits for the executing quantum service (e.g., by invoking functionality of the qubit registry, as a non-limiting example). However, if the QBS determines that the one or more qubits are unavailable for allocation, the QBS places the executing quantum service into a sleep state (e.g., by invoking functionality of a quantum service manager, as a non-limiting example). Some examples may provide that the QBS places the executing quantum service into a sleep state by first storing a current state of the first executing quantum service, and then halting execution of the executing quantum service (e.g., by invoking functionality of the quantum service manager, as a non-limiting example). Subsequently, the QBS in some examples may receive an indication (e.g., from the qubit registry, as a non-limiting example) that the one or more qubits have become available for allocation. The indication may be sent responsive to a request from the QBS for notification of a change in the availability of the one or more qubits. Upon receiving the indication, the QBS restores the executing quantum service into an executing state (e.g., by invoking functionality of the quantum service manager, as a non-limiting example).

The QBS then allocates the one or more qubits for the executing quantum service. In some examples, the QBS may allocate the one or more qubits for the executing quantum service by updating a definition of the first executing quantum service to identify the first one or more qubits. The definition may be, e.g., a runtime instantiation of a Quantum Assembly (QASM) file defining the executing quantum service.

FIG. 1 is a block diagram of a quantum computing device 10 that comprises a system memory 12 and a processor device 14. The quantum computing device 10 further comprises a persistent data store 16 (e.g., a hard drive or Solid State Drive (SSD), as non-limiting examples). It is to be understood that the quantum computing device 10 in some examples may include constituent elements in addition to those illustrated in FIG. 1. The quantum computing device 10 operates in quantum environments but is capable of operating using classical computing principles or quantum computing principles. When using quantum computing principles, the quantum computing device 10 performs computations that utilize quantum-mechanical phenomena, such as superposition and/or entanglement states. The quantum computing device 10 may operate under certain environmental conditions, such as at or near zero degrees (0°) Kelvin. When using classical computing principles, the quantum computing device 10 utilizes binary digits that have a value of either zero (0) or one (1).

In the example of FIG. 1, the quantum computing device 10 implements a set of one or more qubits 18(0)-18(Q) for use by quantum services executed by the quantum computing device 10. To maintain information for the qubit(s) 18(0)-18(Q), the quantum computing device 10 includes a qubit registry 20, which comprises a plurality of qubit registry entries 22(0)-22(R) each corresponding to a qubit such as the one or more qubits 18(0)-18(Q). The qubit registry 20 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries 22(0)-22(R) of the qubit registry 20 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 10 of FIG. 1 executes one or more quantum services, such as the quantum service 24 and the quantum service 26. The quantum service 24 and the quantum service 26 are processes that employ qubits such as the one or more qubits 18(0)-18(Q) to provide desired functionality. Execution of quantum services such as the quantum service 24 and the quantum service 26 is facilitated by a quantum service manager 28 and a quantum service scheduler 30. The quantum service manager 28 of the quantum computing device 10 handles operations for creating, monitoring, and terminating quantum services, while the quantum service scheduler 30 of the quantum computing device 10 controls the scheduling of quantum services for execution by the processor device 14, and allocation of processing resources to executing quantum services. The functionality of the quantum service manager 28 and the quantum service scheduler 30 may be made accessible to other processes (e.g., via a defined application programming interface (API), as a non-limiting example).

Because the number of qubit(s) 18(0)-18(Q) is limited, executing quantum services such as the quantum service 24 and the quantum service 26 may find themselves in competition with one another for runtime allocation of the one or more of the qubit(s) 18(0)-18(Q) maintained by the quantum computing device 10. Thus, it is desirable for the quantum computing device 10 to be able to efficiently manage runtime qubit allocation for executing quantum services. For instance, in one possible use case, an organization making use of the quantum computing device 10 may need to manage execution of both the quantum service 24 and the quantum service 26, despite the quantum computing device 10 not having a sufficient number of qubit(s) 18(0)-18(Q) to meet the needs of both the quantum service 24 and the quantum service 26 at the same time.

Accordingly, the quantum computing device 10 of FIG. 1 implements a QBS 32 for managing runtime qubit allocation for executing quantum services. In exemplary operation, the QBS 32 receives a request 34 from the quantum service scheduler 30 for allocation of one or more qubits, such as the one or more qubits 18(0)-18(Q), for an executing quantum service such as the quantum service 24. The request 34 according to some examples may comprise a request for a specified number of the qubit(s) 18(0)-18(Q), while the request 34 in some examples may a request for one or more identified qubits of the qubit(s) 18(0)-18(Q).

Upon receiving the request 34, the QBS 32 determines whether the one or more qubits 18(0)-18(Q) are unavailable for execution. In embodiments in which the request 34 indicates a request for a specific number of the qubit(s) 18(0)-18(Q), the QBS 32 may determine whether fewer than the specified number of qubit(s) 18(0)-18(Q) are available for allocation. Similarly, if the request 34 indicates one or more identified qubits among the qubit(s) 18(0)-18(Q), the QBS 32 may determine whether at least one of the one or more identified qubits are unavailable for allocation. In some examples, the QBS 32 may ascertain the availability of the one or more qubits 18(0)-18(Q) by consulting the qubit registry 20.

If the QBS 32 determines that the one or more qubits 18(0)-18(Q) are available to satisfy the request 34, the QBS 32 allocates the one or more qubits 18(0)-18(Q) for the executing quantum service 24, by, for example, invoking functionality of the qubit registry 20. However, if the QBS 32 determines that the one or more qubits 18(0)-18(Q) are unavailable for allocation, the QBS 32 places the executing quantum service 24 into a sleep state. This protects the state of the one or more qubits 18(0)-18(Q) from corruption by the executing quantum service 24, places the executing quantum service 24 into a safe state until the one or more qubits 18(0)-18(Q) become available again, and enables an executing quantum service currently using the one or more qubits 18(0)-18(Q) (such as the quantum service 26) to safely continue execution. According to some examples, the QBS 32 may place the executing quantum service 24 into a sleep state by invoking functionality of the quantum service manager 28, as a non-limiting example. Some examples may provide that the QBS 32 places the executing quantum service 24 into a sleep state by first storing a current state 36 of the executing quantum service 24 (e.g., using the persistent data store 16), and then halting execution of the executing quantum service 24 (e.g., by invoking functionality of the quantum service manager 28).

The QBS 32 in some examples may subsequently receive an indication 38 that the one or more qubits 18(0)-18(Q) have become available for allocation. The indication 38 may be provided in some examples by the qubit registry 20 and may be sent responsive to a request (not shown) from the QBS 32 for notification of a change in the availability of the one or more qubits 18(0)-18(Q). In response to receiving the indication 38, the QBS 32 restores the executing quantum service 24 into an executing state (e.g., by invoking functionality of the quantum service manager 28, as a non-limiting example). The QBS 32 then allocates the one or more qubits 18(0)-18(Q) for the executing quantum service 24.

In some examples, the quantum computing device 10 may maintain a runtime definition 40 of the executing quantum service 24 while the quantum service 24 is running. This definition 40 may be, e.g., a runtime instantiation of a QASM file that defines the quantum service 24, and that is separate from but based on a QASM file (not shown) that defines the quantum service 24. The definition 40 contains quantum programming instructions that define content and configuration of the quantum service 24. In such examples, the QBS 32 may allocate the one or more qubits 18(0)-18(Q) for the executing quantum service 24 by updating the definition 40 of the executing quantum service 24 to identify the one or more qubits 18(0)-18(Q).

It is to be understood that, because the QBS 32 is a component of the quantum computing device 10, functionality implemented by the QBS 32 may be attributed to the quantum computing device 10 generally. Moreover, in examples where the QBS 32 comprises software instructions that program the processor device 14 to carry out functionality discussed herein, functionality implemented by the QBS 32 may be attributed herein to the processor device 14. It is to be further understood that while, for purposes of illustration only, the QBS 32 is depicted as a single component, the functionality implemented by the QBS 32 may be implemented in any number of components, and the examples discussed herein are not limited to any particular number of components.

Figure 2A:
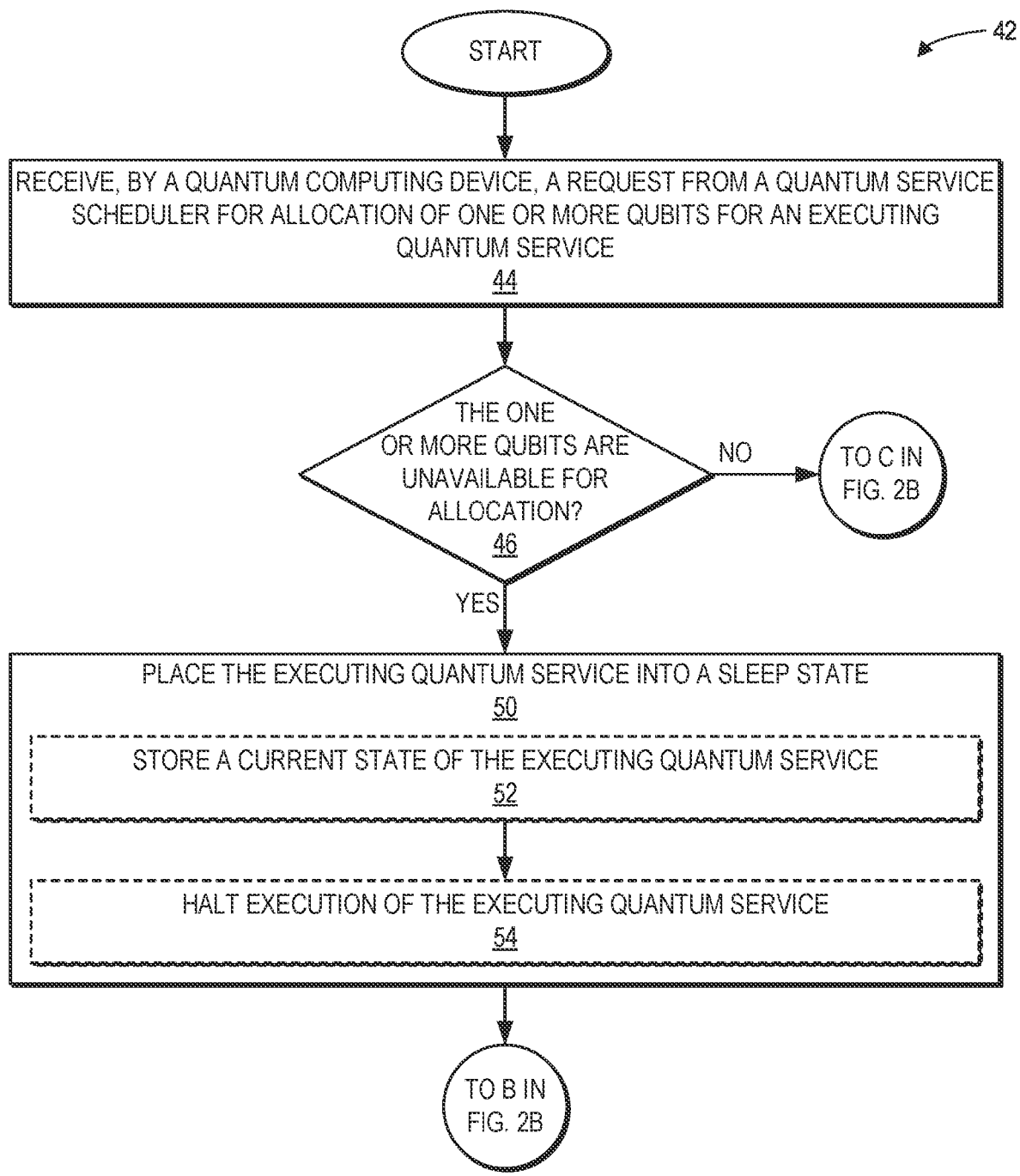
FIGS. 2A and 2B are flowcharts illustrating operations performed by the computing system of FIG. 1 for managing runtime qubit allocation for executing quantum services, according to one example.
Figure 2B:
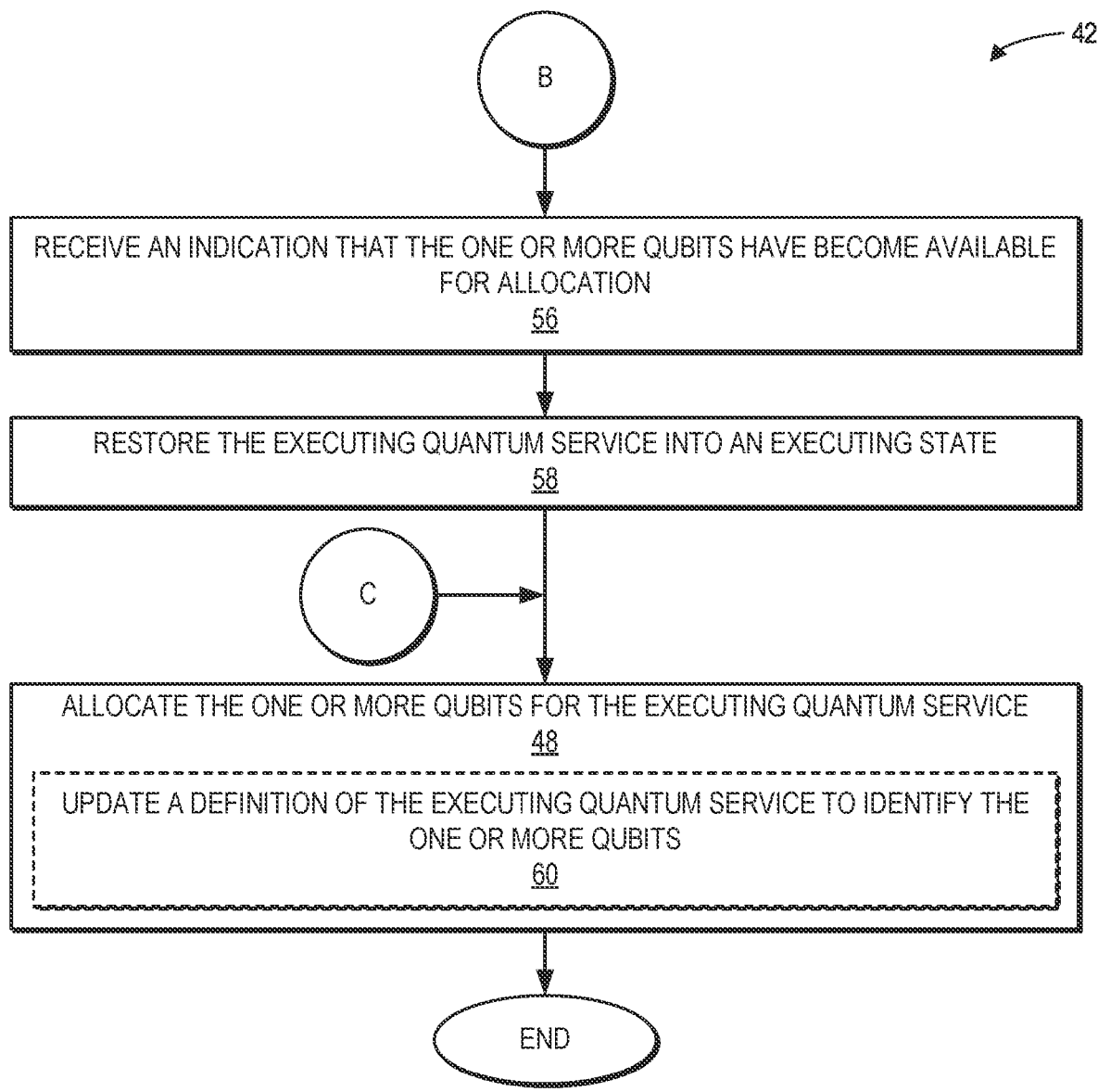

To illustrate exemplary operations performed by the quantum computing device 10 of FIG. 1 for managing runtime qubit allocation for executing quantum services according to one example, FIGS. 2A and 2B provide a flowchart 42. Elements of FIG. 1 are referenced in describing FIGS. 2A and 2B for the sake of clarity. In FIG. 2A, operations begin with a processor device of a quantum computing device, such as the processor device 14 of the quantum computing device 10 of FIG. 1, receiving (e.g., by executing the QBS 32) the request 34 from the quantum service scheduler 30 for allocation of the one or more qubits 18(0)-18(Q) for an executing quantum service, such as the executing quantum service 24 (block 44). The processor device 14 next determines whether the one or more qubits 18(0)-18(Q) are unavailable for allocation (block 46). In some examples in which the request 34 for allocation of the one or more qubits 18(0)-18(Q) comprises a request for allocation of a specified number of qubits, the operations of block 46 for determining whether the one or more qubits 18(0)-18(Q) are unavailable for allocation may comprise determining whether fewer than the specified number of qubits are available for allocation. Some examples, in which the request 34 for allocation of the one or more qubits 18(0)-18(Q) comprises a request for allocation of one or more identified qubits, may provide that the operations of block 46 for determining whether the one or more qubits 18(0)-18(Q) are unavailable for allocation comprise determining whether at least one of the one or more identified qubits are unavailable for allocation.

If the processor device 14 determines at decision block 46 that the one or more qubits 18(0)-18(Q) are not unavailable for execution (i.e., the requested one or more qubits 18(0)-18(Q) can be allocated to the executing quantum service 24), operations resume at block 48 of FIG. 2B. However, if the processor device 14 determines at decision block 46 that the one or more qubits 18(0)-18(Q) are unavailable for execution, the processor device 14 (e.g., using the QBS 32) places the executing quantum service 24 into a sleep state (block 50). According to some examples, the operations of block 50 for placing the executing quantum service 24 into a sleep state may include first storing the current state 36 of the executing quantum service 24 (e.g., using the persistent data store 16 of FIG. 1, as a non-limiting example) (block 52). The processor device 14 may then halt execution of the executing quantum service 24 (e.g., by invoking functionality of the quantum service scheduler 30 of FIG. 1, as a non-limiting example) (block 54). Operations in some examples may then continue at block 56 of FIG. 2B.

Referring now to FIG. 2B, in some examples, the processor device 14 may receive the indication 38 (e.g., from the qubit registry 20 of FIG. 1, as a non-limiting example) that the one or more qubits 18(0)-18(Q) have become available for allocation (block 56). In response, the processor device 14 restores the executing quantum service 24 into an executing state (e.g., by invoking functionality of the quantum service scheduler 30 of FIG. 1, as a non-limiting example) (block 58). The processor device 14 then allocates the one or more qubits 18(0)-18(Q) for the executing quantum service 24 (block 48). In some examples, the operations of block 48 for allocating the one or more qubits 18(0)-18(Q) for the executing quantum service 24 may comprise updating the definition 40 of the executing quantum service 24 to identify the one or more qubits 18(0)-18(Q) (block 60). As discussed above, some examples may provide that the definition 40 of the executing quantum service 24 may comprise a runtime instantiation of a QASM file.

Figure 3:
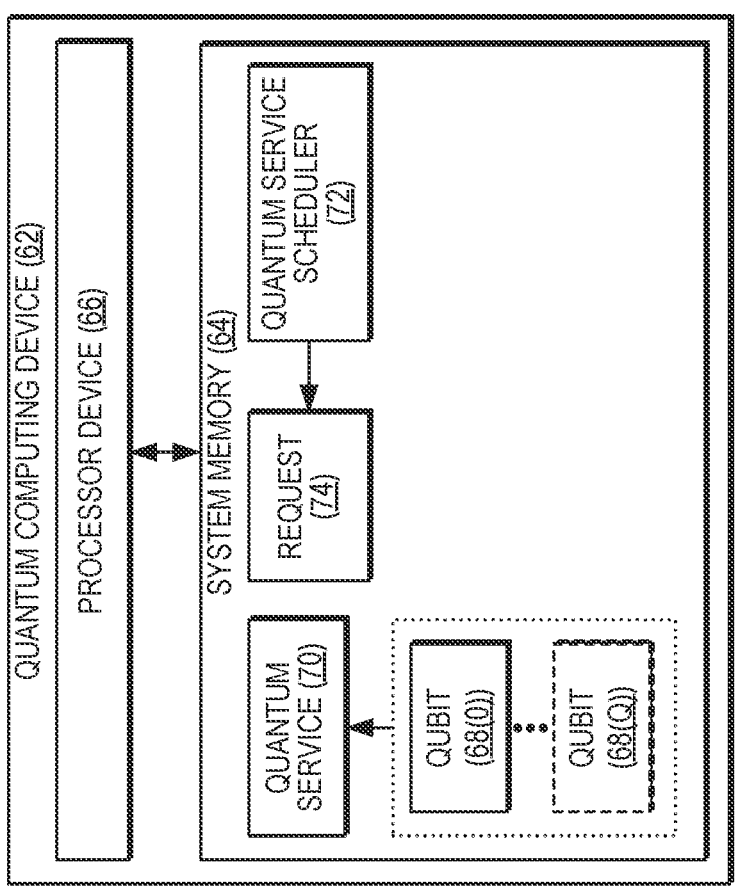
FIG. 3 is a simpler block diagram of the quantum computing device of FIG. 1 for managing runtime qubit allocation for executing quantum services, according to one example.

FIG. 3 is a simpler block diagram of the quantum computing device 10 of FIG. 1 for managing runtime qubit allocation for executing quantum services, according to one example. In the example of FIG. 3, a quantum computing device 62 comprises a system memory 64 and a processor device 66. The quantum computing device 62 implements a set of one or more qubits 68(0)-68(Q) for use by quantum services executed by the quantum computing device 62. The quantum computing device 62 of FIG. 3 executes a quantum service 70, which employ qubits such as the one or more qubits 68(0)-68(Q) to provide a desired functionality. Execution of quantum services such as the quantum service 70 is facilitated by a quantum service scheduler 72, which controls the scheduling of quantum services for execution by the processor device 66, and allocation of processing resources to executing quantum services.

In exemplary operation, the processor device 66 receives a request 74 from the quantum service scheduler 72 for allocation of one or more qubits, such as the one or more qubits 68(0)-68(Q), for an executing quantum service such as the quantum service 70. Upon receiving the request 74, the processor device 66 determines that the one or more qubits 68(0)-68(Q) are unavailable for execution. The processor device 66 then places the executing quantum service 70 into a sleep state.

Figure 4:
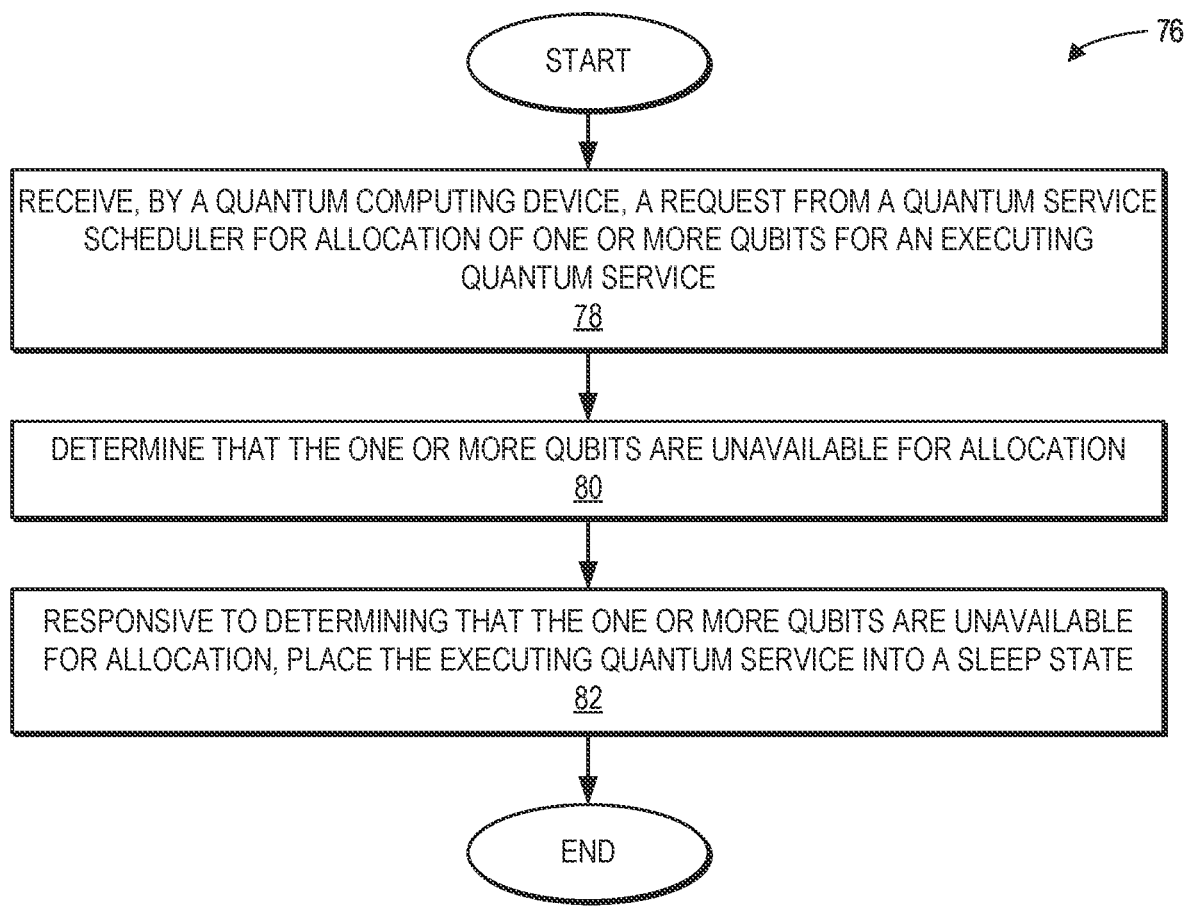
FIG. 4 is a flowchart of a simplified method for managing runtime qubit allocation for executing quantum services by the quantum computing device of FIG. 3, according to one example.

FIG. 4 provides a flowchart 76 of a simplified method for managing runtime qubit allocation for executing quantum services by the quantum computing device 62 of FIG. 3, according to one example. For the sake of clarity, elements of FIG. 3 are referenced in describing FIG. 4. Operations in FIG. 4 begin with the processor device 66 of the quantum computing device 62 receiving the request 74 from the quantum service scheduler 72 for allocation of the one or more qubits 68(0)-68(Q) for an executing quantum service, such as the executing quantum service 70 (block 78). The processor device 66 determines that the one or more qubits 68(0)-68(Q) are unavailable for allocation (block 80). The processor device 66 then, responsive to determining that the one or more qubits 68(0)-68(Q) are unavailable for allocation, places the executing quantum service 70 into a sleep state (block 82).

Figure 5:
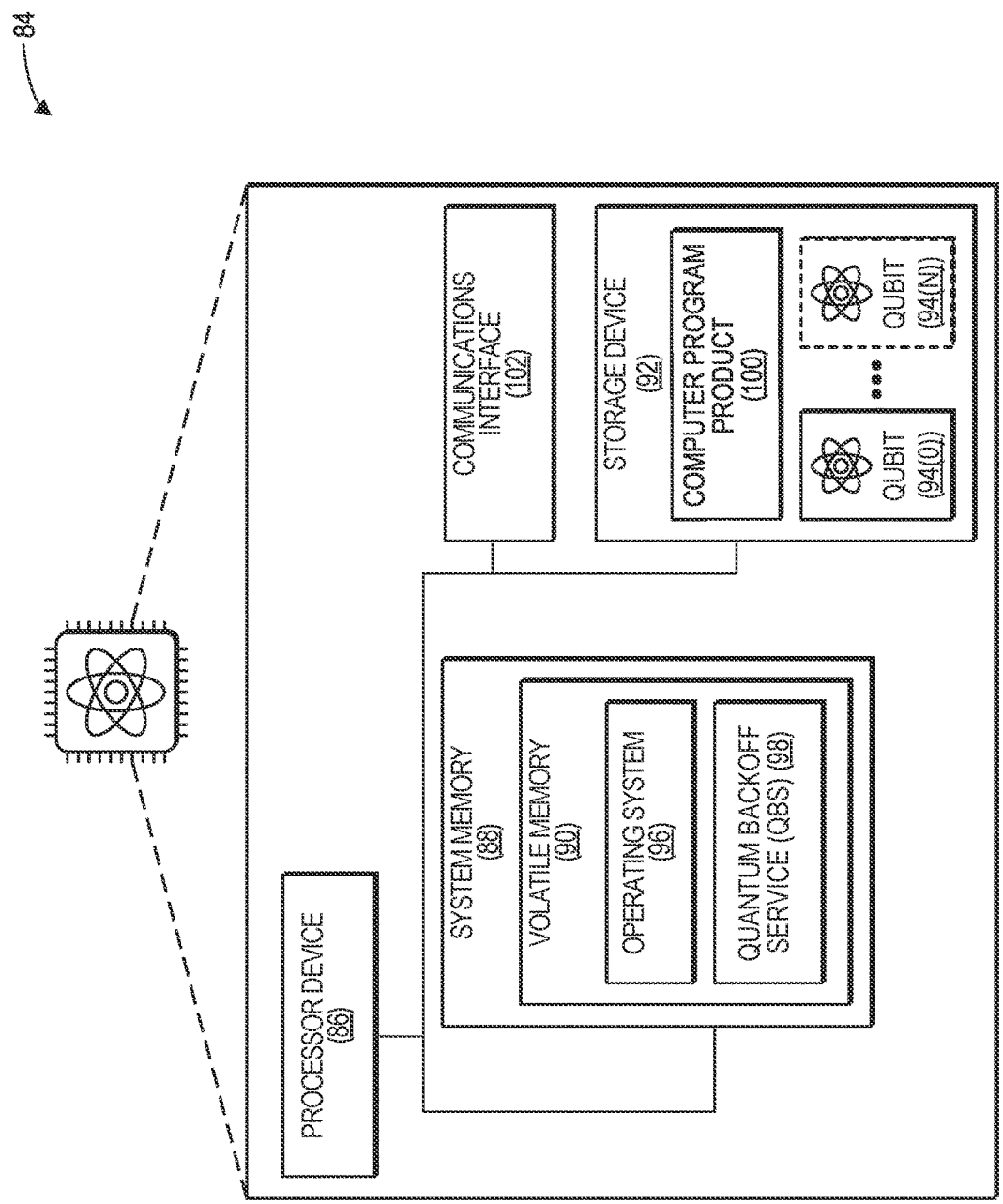
FIG. 5 is a block diagram of a quantum computing device suitable for implementing examples, according to one example.

FIG. 5 is a block diagram of a quantum computing device 84, such as the quantum computing device 10 of FIG. 1, suitable for implementing examples according to one example. The quantum computing device 84 may comprise any suitable quantum computing device or devices. The quantum computing device 84 can operate using classical computing principles or quantum computing principles. When using quantum computing principles, the quantum computing device 84 performs computations that utilize quantum-mechanical phenomena, such as superposition and entanglement. The quantum computing device 84 may operate under certain environmental conditions, such as at or near zero degrees (0°) Kelvin. When using classical computing principles, the quantum computing device 84 utilizes binary digits that have a value of either zero (0) or one (1).

The quantum computing device 84 includes a processor device 86 and a system memory 88. The processor device 86 can be any commercially available or proprietary processor suitable for operating in a quantum environment. The system memory 88 may include volatile memory 90 (e.g., random-access memory (RAM)). The quantum computing device 84 may further include or be coupled to a non-transitory computer-readable medium such as a storage device 92. The storage device 92 and other drives associated with computer-readable media and computer-usable media may provide non-volatile storage of data, data structures, computer-executable instructions, and the like. The storage device may also provide functionality for storing one or more qubits 94(0)-94(N).

A number of modules can be stored in the storage device 92 and in the volatile memory 90, including an operating system 96 and one or more modules, such as a QBS 98. All or a portion of the examples may be implemented as a computer program product 100 stored on a transitory or non-transitory computer-usable or computer-readable medium, such as the storage device 92, which includes complex programming instructions, such as complex computer-readable program code, to cause the processor device 86 to carry out the steps described herein. Thus, the computer-readable program code can comprise computer-executable instructions for implementing the functionality of the examples described herein when executed on the processor device 86.

An operator may also be able to enter one or more configuration commands through a keyboard (not illustrated), a pointing device such as a mouse (not illustrated), or a touch-sensitive surface such as a display device (not illustrated). The quantum computing device 84 may also include a communications interface 102 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:
1. A method, comprising:
receiving, by a quantum computing device that implements a total number of qubits, a first request from a quantum service scheduler for allocation of a specified number of qubits for a first executing quantum service;

determining a count of a number of available qubits that are currently available for allocation from the total number of qubits;

determining that the count of the number of available qubits is fewer than the specified number of qubits;

responsive to determining that the count of the number of available qubits is fewer than the specified number of qubits, determining that the specified number of qubits are unavailable for allocation; and responsive to determining that the specified number of qubits are unavailable for allocation, placing the first executing quantum service into a sleep state.

2. The method of claim 1, wherein placing the first executing quantum service into a sleep state comprises:

storing a current state of the first executing quantum service; and halting execution of the first executing quantum service.

3. The method of claim 1, further comprising, subsequent to placing the first executing quantum service into a sleep state:

receiving an indication that the specified number of qubits have become available for allocation;

restoring the first executing quantum service into an executing state; and allocating the specified number of qubits for the first executing quantum service.

4. The method of claim 3, wherein allocating the specified number of qubits for the first executing quantum service comprises updating a definition of the first executing quantum service to identify the qubits allocated for the first executing quantum service.

5. The method of claim 4, wherein the definition of the first executing quantum service comprises a runtime instantiation of a Quantum Assembly (QASM) file.

6. The method of claim 1, further comprising:

receiving a second request from the quantum service scheduler for allocation of a second one or more qubits for a second executing quantum service;

determining that the second one or more qubits are available for allocation; and responsive to determining that the second one or more qubits are available for allocation, allocating the second one or more qubits for the second executing quantum service.

7. The method of claim 1, wherein determining the count of the number of available qubits that are currently available for allocation comprises, for at least one qubit of the total number of qubits, evaluating an entanglement indicator for the at least one qubit, wherein the entanglement indicator is indicative of whether the at least one qubit is in an entangled state.

8. A quantum computing device that implements a total number of qubits, the quantum computing device comprising:

a system memory; and a processor device communicatively coupled to the system memory, the processor device to:

receive a first request from a quantum service scheduler for allocation of a specified number of qubits for a first executing quantum service;

determine a count of a number of available qubits that are currently available for allocation from the total number of qubits;

determine that the count of the number of available qubits is fewer than the specified number of qubits;

responsive to determination that the count of the number of available qubits is fewer than the specified number of qubits, determine that the specified number of qubits are unavailable for allocation; and responsive to determining that the specified number of qubits are unavailable for allocation, place the first executing quantum service into a sleep state.

9. The quantum computing device of claim 8, wherein to place the first executing quantum service into a sleep state is to:

store a current state of the first executing quantum service; and halt execution of the first executing quantum service.

10. The quantum computing device of claim 8, wherein the processor device is further to, subsequent to placing the first executing quantum service into a sleep state:

receive an indication that the specified number of qubits have become available for allocation;

restore the first executing quantum service into an executing state; and allocate the specified number of qubits for the first executing quantum service.

11. The quantum computing device of claim 10, wherein to allocate the specified number of qubits for the first executing quantum service is to update a definition of the first executing quantum service to identify the qubits allocated for the first executing quantum service.

12. The quantum computing device of claim 11, wherein the definition of the first executing quantum service comprises a runtime instantiation of a Quantum Assembly (QASM) file.

13. The quantum computing device of claim 8, wherein the processor device is further to:

receive a second request from the quantum service scheduler for allocation of a second one or more qubits for a second executing quantum service;

determine that the second one or more qubits are available for allocation; and responsive to determining that the second one or more qubits are available for allocation, allocate the second one or more qubits for the second executing quantum service.

14. The quantum computing device of claim 8, wherein to determine the count of the number of available qubits that are currently available for allocation is to, for at least one qubit of the total number of qubits, evaluate an entanglement indicator for the at least one qubit, wherein the entanglement indicator is indicative of whether the at least one qubit is in an entangled state.

15. A non-transitory computer-readable medium having stored thereon computer-executable instructions that, when executed, cause one or more processor devices to:

receive a first request from a quantum service scheduler for allocation, from a total number of qubits, of a specified number of qubits for a first executing quantum service;

determine a count of a number of available qubits that are currently available for allocation from the total number of qubits;

determine that the count of the number of available qubits is fewer than the specified number of qubits;

responsive to determination that the count of the number of available qubits is fewer than the specified number of qubits, determine that the specified number of qubits are unavailable for allocation; and responsive to determining that the specified number of qubits are unavailable for allocation, place the first executing quantum service into a sleep state.

16. The non-transitory computer readable medium of claim 15, wherein to place the first executing quantum service into a sleep state is to:
- store a current state of the first executing quantum service; and
- halt execution of the first executing quantum service.

17. The non-transitory computer readable medium of claim 15, wherein the computer-executable instructions further cause the one or more processor devices to, subsequent to placing the first executing quantum service into a sleep state:
- receive an indication that the specified number of qubits have become available for allocation;
- restore the first executing quantum service into an executing state; and
- allocate the specified number of qubits for the first executing quantum service.

18. The non-transitory computer readable medium of claim 15, wherein the computer-executable instructions further cause the one or more processor devices to:
- receive a second request from the quantum service scheduler for allocation of a second one or more qubits for a second executing quantum service;
- determine that the second one or more qubits are available for allocation; and
- responsive to determining that the second one or more qubits are available for allocation, allocate the second one or more qubits for the second executing quantum service.

19. The non-transitory computer readable medium of claim 15, wherein to determine the count of the number of available qubits that are currently available for allocation is to, for at least one qubit of the total number of qubits, evaluate an entanglement indicator for the at least one qubit, wherein the entanglement indicator is indicative of whether the at least one qubit is in an entangled state.

* * * * *